US009892579B2

(12) United States Patent
Ku

(10) Patent No.: US 9,892,579 B2
(45) Date of Patent: Feb. 13, 2018

(54) CONTROL METHOD FOR SMART LOCK, A SMART LOCK, AND A LOCK SYSTEM

(71) Applicant: Che-Ming Ku, Taichung (TW)

(72) Inventor: Che-Ming Ku, Taichung (TW)

( * ) Notice: Subject to any disclaimer, the term of this patent is extended or adjusted under 35 U.S.C. 154(b) by 0 days.

(21) Appl. No.: 14/820,036

(22) Filed: Aug. 6, 2015

(65) Prior Publication Data

US 2016/0042581 A1 Feb. 11, 2016

Related U.S. Application Data

(60) Provisional application No. 62/033,666, filed on Aug. 6, 2014, provisional application No. 62/115,975, filed on Feb. 13, 2015.

(51) Int. Cl.
*G05B 19/00* (2006.01)
*G07C 9/00* (2006.01)

(52) U.S. Cl.
CPC ....... *G07C 9/00309* (2013.01); *G07C 9/0069* (2013.01); *G07C 2009/00769* (2013.01)

(58) Field of Classification Search
None
See application file for complete search history.

(56) References Cited

U.S. PATENT DOCUMENTS 9,624,695 B1 * 4/2017 Cheng ................. E05B 47/0001
2004/0080403 A1 4/2004 Ehsel
2009/0237206 A1 9/2009 Anderson
2013/0055773 A1 3/2013 Li
2013/0141383 A1 6/2013 Woolley
2013/0169411 A1 7/2013 Chan et al.
2013/0335193 A1 12/2013 Hanson et al.
2014/0265359 A1 9/2014 Cheng et al.
2014/0326027 A1 11/2014 Avganim
2015/0012886 A1 1/2015 Lu et al.
2015/0356801 A1 * 12/2015 Nitu .................. G07C 9/00166
340/5.61

FOREIGN PATENT DOCUMENTS

JP 2002180714 * 6/2002
WO 2014067238 A1 5/2014

OTHER PUBLICATIONS

International Search Report issued in PCT Application No. PCT/US2016/016466 by ISA dated May 31, 2016 (4 pages).

* cited by examiner

*Primary Examiner* — Adolf Dsouza
(74) *Attorney, Agent, or Firm* — Hamre, Schumann, Mueller & Larson, P.C.

(57) ABSTRACT

A control method of a smart lock is to be implemented by a mobile device which is communicably coupled to the smart lock. The control method includes the steps of sensing touch inputs performed upon the mobile device so as to generate a sensing signal, determining whether the sensing signal conforms to a preset touch code, which is associated with a predetermined sequence of touch inputs on the mobile device, generating a control signal which is to be transmitted to the smart lock for controlling the smart lock to lock or unlock when it is determined that the sensing signal conforms to the preset touch code; and transmitting the control signal to the smart lock.

14 Claims, 10 Drawing Sheets

CONTROL METHOD FOR SMART LOCK, A SMART LOCK, AND A LOCK SYSTEM

CROSS-REFERENCE TO RELATED APPLICATION

This application claims priorities of U.S. Provisional Application No. 62/033,666, filed on Aug. 6, 2014, and No. 62/115,975, filed on Feb. 13, 2015.

FIELD

The disclosure relates to a control method for a smart lock, more particularly to a control method for a smart lock by sensing touch inputs to a mobile device.

BACKGROUND

Referring to FIG. 1, a lock device 100, such as a conventional one, includes a thumb turn 101 and a latch 102. When the thumb burn 101 is operated, for example, is rotated by a user in a clockwise direction (direction A), the latch 102 is actuated to extend outwardly (direction B) of a door panel 103, and the lock device 100 is in a lock state. Once the door panel 103 is fully closed, the latch 102 extends into a strike plate disposed on a door frame (not shown) so as to hold the door panel 103 in a closed condition. On the other hand, when the thumb turn 101 is rotated in an opposite direction, e.g., the counterclockwise direction, the latch 102 is actuated to retract, and the lock device 100 is in an unlock state, such that the latch 102 disengages the strike plate to allow movement of the door panel 103.

SUMMARY

Therefore, an object of the disclosure is to provide a control method for a smart lock, the smart lock which is to be mounted on a conventional lock device for remotely controlling locking or unlocking of the conventional lock device, and a lock system.

According to a first aspect of the disclosure, the control method of a smart lock is to be implemented by a mobile device which is communicably coupled to the smart lock. The control method includes the steps of:

sensing touch inputs performed upon the mobile device so as to generate a sensing signal;

determining whether the sensing signal conforms to a preset touch code, which is associated with a predetermined sequence of touch inputs on the mobile device;

generating a control signal which is to be transmitted to the smart lock for controlling the smart lock to lock or unlock when it is determined that the sensing signal conforms to the preset touch code; and transmitting the control signal to the smart lock.

According to a second aspect of the disclosure, the smart lock is to be removably mounted to a lock device and is to be remotely controlled by a mobile device to cause the lock device to switch between a lock state and an unlock state. The lock device includes a thumb turn. The smart lock includes a housing which is formed with an opening, an intermediate coupling which is to be coupled to the thumb turn of the lock device via the opening of the housing, an actuate unit which is coupled to the intermediate coupling, and which is configured to actuate operation of the intermediate coupling so as to cause rotation of the thumb turn, a wireless unit which is configured to receive a control signal from the mobile device, and a control circuit which is coupled to the wireless unit, and which receives the control signal from the mobile device via the wireless unit.

The control circuit is configured to generate an actuate signal in response to receipt of the control signal, and is further coupled electrically to the actuate unit for transmitting the actuate signal generated thereby to the actuate unit to activate the actuate unit.

According to a third aspect of the disclosure, a control method of a smart lock is to be implemented by the smart lock, and includes the steps of:

sensing touch inputs performed upon the smart lock so as to generate a sensing signal;

determining whether the sensing signal conforms to a preset touch code, which is associated with a predetermined sequence of touch inputs on the smart lock; and generating a control signal for controlling the smart lock to lock or unlock when it is determined that the sensing signal conforms to the preset touch code.

According to a fourth aspect of the disclosure, the lock system includes a user device, a service provider server and a smart lock device.

The user device is operable to send an electronic key. The service provider server is communicably coupled to the user device for receiving the electronic key. The smart lock device is to be interfaced with a lock device, and includes an actuating unit, a communication gateway, a Bluetooth module and a microcontroller. The actuating unit is to be attached to a thumb turn of the lock device, and when activated turns the thumb turn by a required angle. The communication gateway is in communication with the service provider server via a Wi-Fi router, receives the electronic key from the service provider server, and forwards the electronic key. The Bluetooth module receives the electronic key from the communication gateway. The microcontroller receives the electronic key from the communication gateway via the Bluetooth module, checks whether the electronic key thus received is an acceptable key, and activates the actuating unit when the electronic key is found to be acceptable, so as to cause the lock device to switch between a lock state and an unlock state.

BRIEF DESCRIPTION OF THE DRAWINGS

Other features and advantages of the disclosure will become apparent in the following detailed description of an embodiment with reference to the accompanying drawings, of which.

DETAILED DESCRIPTION

Figure 2:
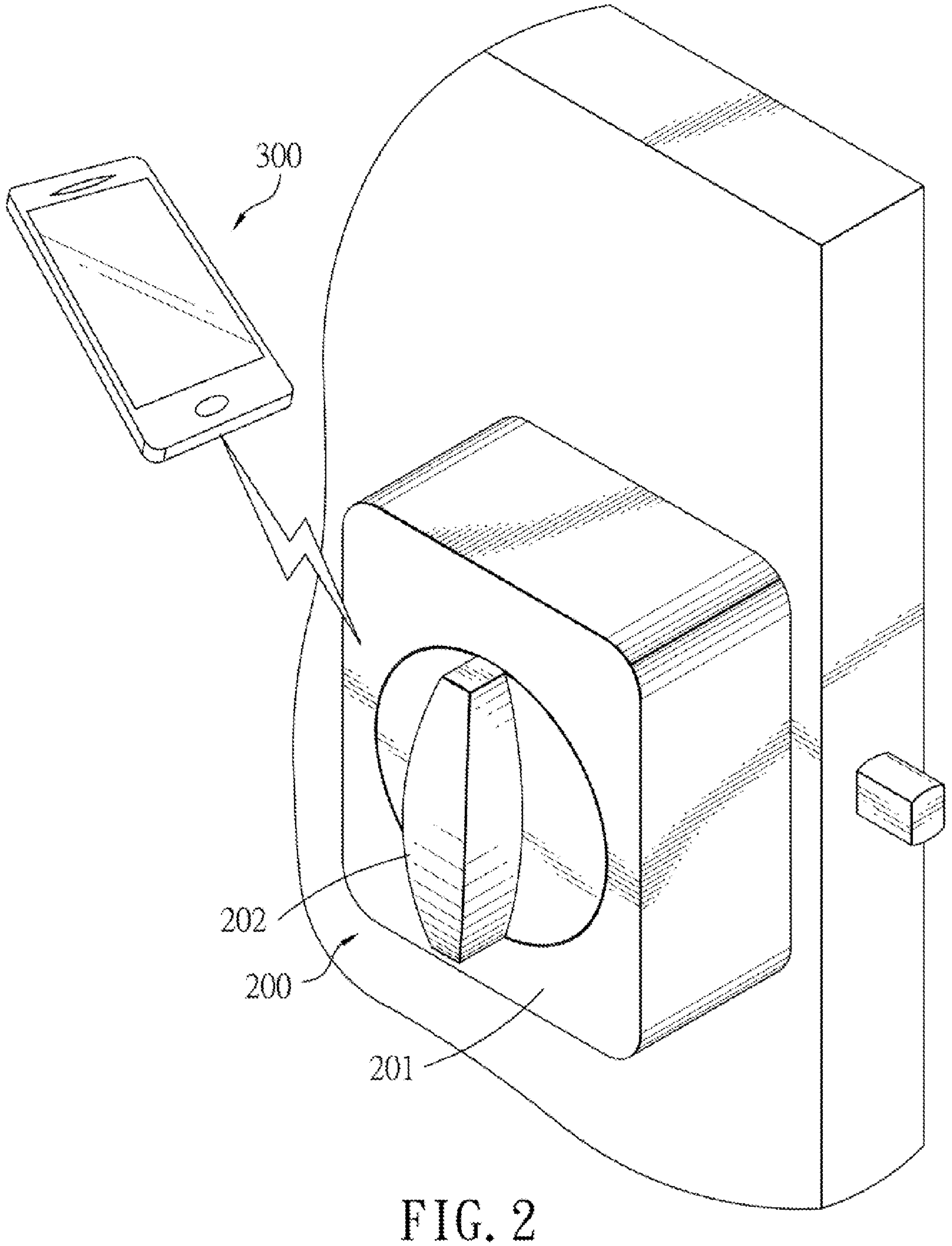
FIG. 2 is a perspective view of a smart lock according to an embodiment of the disclosure.
Figure 3:
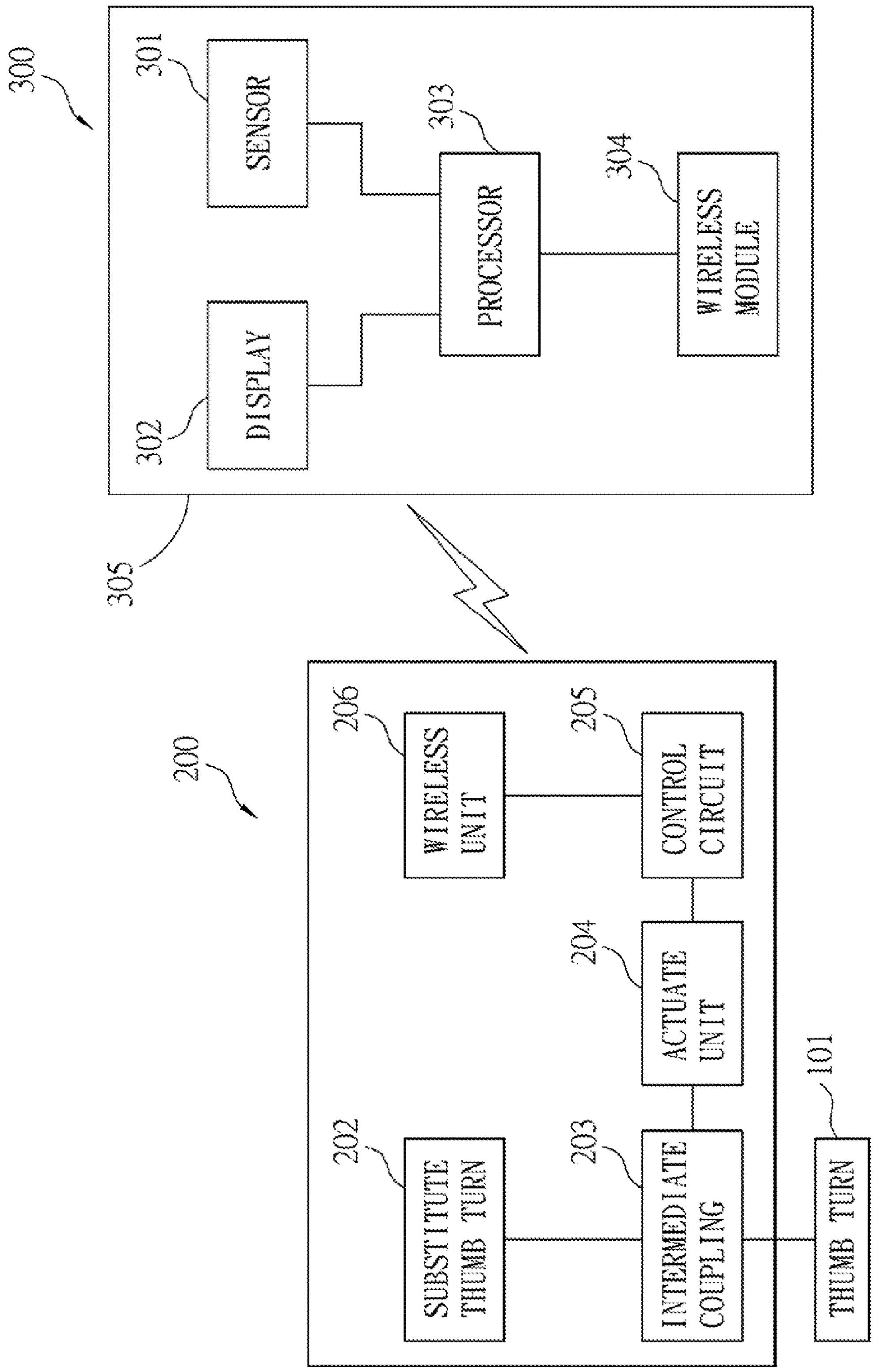
FIG. 3 is a block diagram illustrating a mobile device and the smart lock.

Referring to FIG. 2 and FIG. 3, a smart lock 200 of the disclosure is illustrated. The smart lock 200 is to be removably mounted to the lock device 100 and thus disposed on the door panel 103. The smart lock 200 is remotely controllable by a mobile device 300 to cause the lock device 100 to switch between the lock state and the unlock state. The smart lock 200 includes a housing 201, a substitute thumb turn 202, an intermediate coupling 203, an actuate unit 204, a control circuit 205 and a wireless unit 206. The control circuit 205 is a microprocessor, or alternatively, may be a microcontroller. The smart lock 200 is powered by a battery (not shown). Alternatively, the smart lock 200 may be powered by a wired power supply.

The housing 201 is formed with a first opening and a second opening, and confines a receiving space for accommodating the substitute thumb turn 202, the intermediate coupling 203, the actuate unit 204, the control circuit 205 and the wireless unit 206.

The substitute thumb turn 202 has a first portion which is disposed in the receiving space confined by the housing 201, and further has a second portion which extends from the first portion through the first opening of the housing 201 and which is accessible outwardly of the housing 201. The substitute thumb turn 202 has a structure similar to that of the thumb turn 101 of the lock device 100, and may also be operated in a rotatable manner.

The intermediate coupling 203 is disposed in the receiving space, is coupled to the substitute thumb turn 202, and is to be further coupled to, such as sleeved on, the thumb turn 101 of the lock device 100 via the second opening of the housing 201. In this embodiment, the intermediate coupling 203 is a universal fit which is universally adapted for various kinds and sizes of thumb turns, and is implemented by the Oldham coupling. However, in a variation of the embodiment, the intermediate coupling 203 may be implemented by tracks inside or outside a rotational plate. In a condition that the smart lock 200 malfunctions or power failure of the smart lock 200 occurs but locking or unlocking of the lock device 100 is still desired by the user, when the substitute thumb turn 202 is operated, e.g., rotated, by the user, the intermediate coupling 203 is driven by rotation of the substitute thumb turn 202 to drive rotation of the thumb turn 101 of the lock device 100, so as to control the lock device 100 to switch between the lock state and the unlock state in a fashion similar to directly operating the thumb turn 101 in the conventional way.

The actuate unit 204 is coupled to the intermediate coupling 203, and is configured to actuate, when activated, rotation of the intermediate coupling 203 so as to cause the thumb turn 101 to rotate. The actuate unit 204 is one of a servomotor, a DC motor, a stepper motor, a solenoid actuator, etc.

The wireless unit 206 is configured to receive a control signal from the mobile device 300 which is used to remotely control the smart lock 200. The wireless unit 206 includes an antenna for data transmission using protocols, such as WiFi, Bluetooth, Near Field Communication (NFC), ZigBee, etc.

The control circuit 205 is coupled electrically to the wireless unit 206, and receives the control signal from the mobile device 300 via the wireless unit 206. The control circuit 205 is configured to generate an actuate signal in response to receipt of the control signal, and is further coupled electrically to the actuate unit 204 for transmitting the actuate signal generated thereby to the actuate unit 204 to activate the actuate unit 204, so that the actuate unit 204 actuates the rotation of the intermediate coupling 203 so as to cause the thumb turn 101 to rotate.

Referring once again to FIG. 3, the mobile device 300 includes a sensor 301, a display 302 having a screen, a processor 303, a wireless module 304, and a casing 305 for accommodating the aforementioned components of the mobile device 300.

Figure 4:
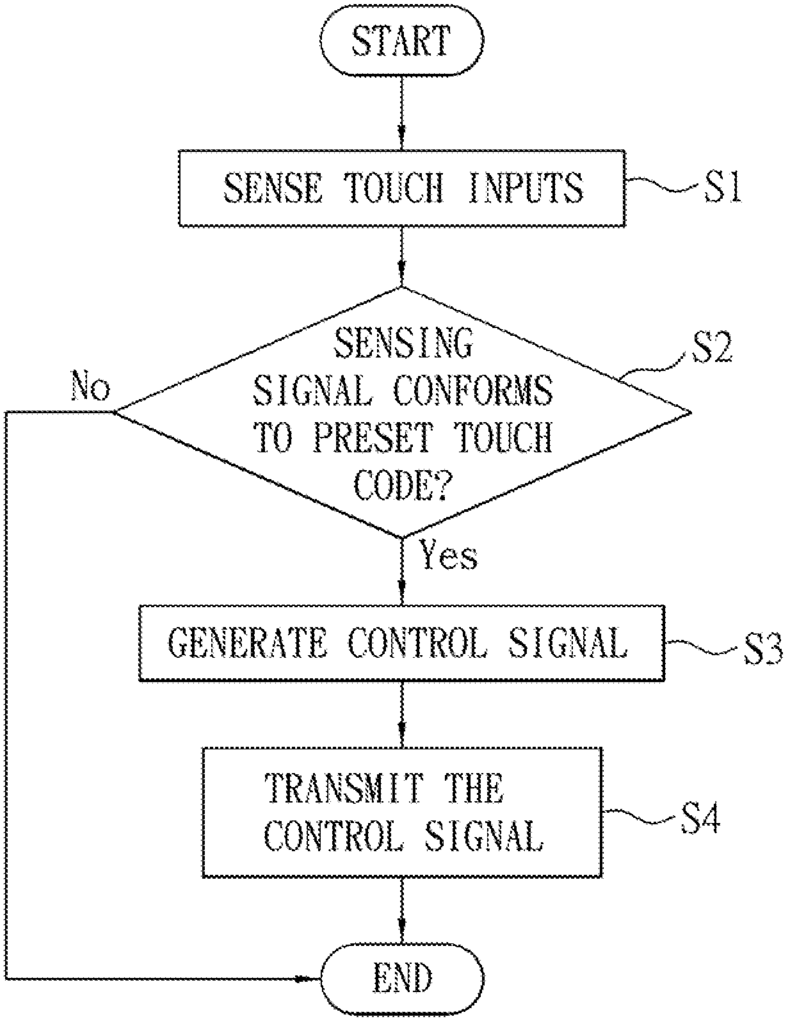
FIG. 4 is a flow chart of an embodiment of a control method for a smart lock of the disclosure.

Referring to FIG. 4, a control method for the smart lock 200 according to the disclosure includes the following steps.

In step S1, the sensor 301 of the mobile device 300 senses touch inputs performed by the user upon the mobile device 300, so as to generate a sensing signal.

In an embodiment of the control method according to the disclosure, the touch inputs are several consecutive knocks by a finger knuckle of the user on the housing 305 regardless of whether the display 302 is activated or unactivated. In this embodiment, the sensor 301 is a gravity sensor, or an accelerometer, which detects vibration of the mobile device 300 resulting from the knocks performed on the housing 305. It is noted that the touch inputs are not limited to knocks by the finger knuckle, and may be, for example, quick pats by a hand of the user on the housing 305, as long as the sensor 301 is able to detect the vibrations of the mobile device 300 resulting from the touch inputs.

In step 32, after receiving the sensing signal from the sensor 301, the processor 303 of the mobile device 300 determines whether the sensing signal conforms to a preset touch code.

In the embodiment of the control method according to the disclosure, in order to distinguish between the vibrations of the mobile device 300 resulting from the knocks on the housing 305 and swings of the mobile device 300 resulting from unintentional movement of the mobile device 300, step S2 of the embodiment of the control method includes the following sub-steps.

Figure 5:
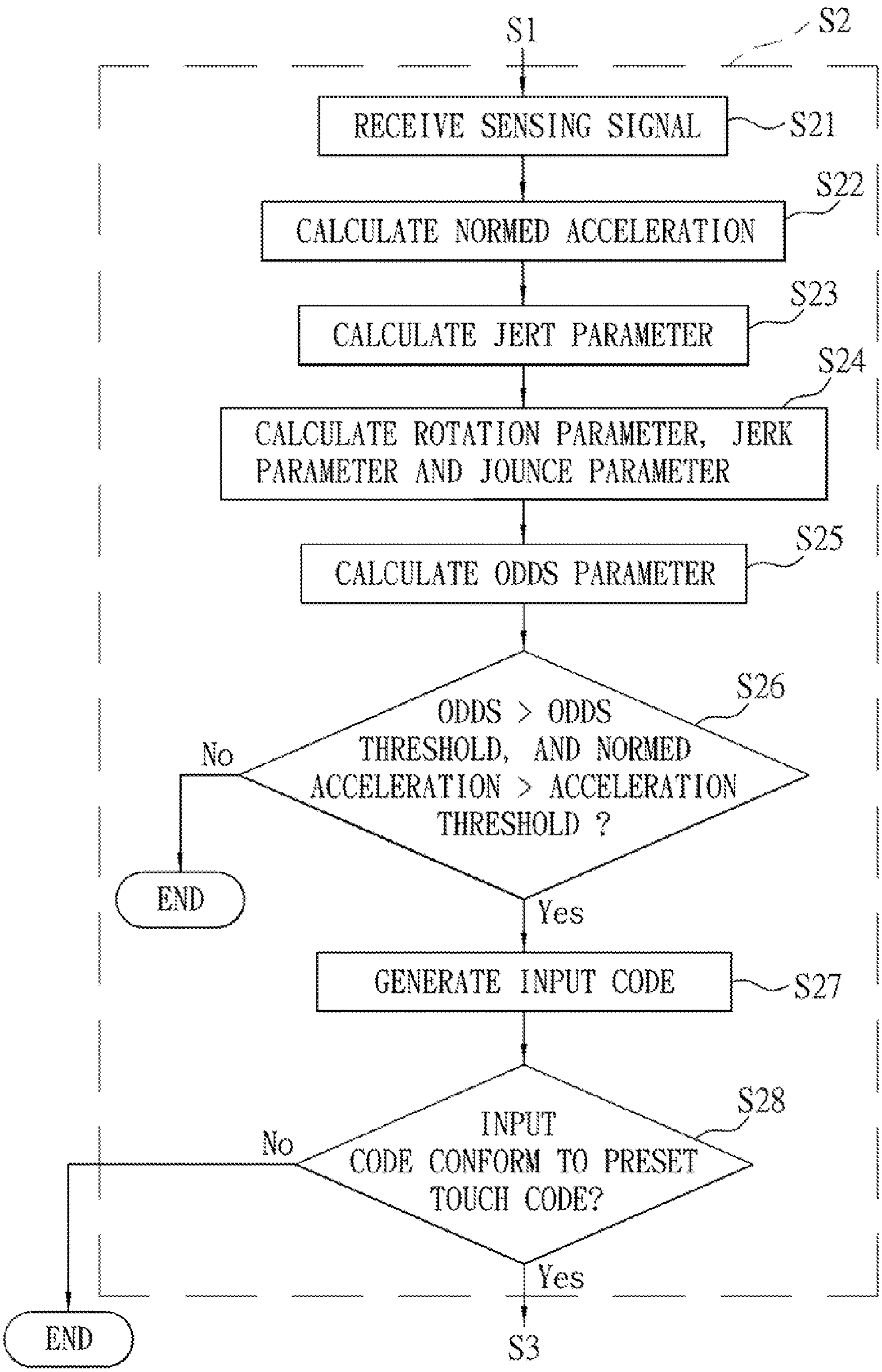
FIG. 5 is a flow chart illustrating sub-steps of step S2 shown in FIG. 4.

Referring to FIG. 5, in step S21, the processor 301 receives the sensing signal which includes at least one entry of acceleration.

In step S22, the processor 301 calculates a normed acceleration for the acceleration of the sensing signal by calculating a square root of the sum of squares of components of the acceleration. In other words, the normed acceleration can be calculated according to the following equation:

$$\text{normed acceleration}=\text{sqrt}(x^2+y^2+z^2),$$

where sqrt( ) stands for the square root operation, and x, y and z are the components of the acceleration.

In step S23, the processor 301 calculates a jert parameter based on the normed acceleration and a previous normed acceleration which is calculated previously before a predefined period of time. Specifically, the jert parameter is associated with the rate of change of the normed acceleration, and the processor calculates the jert parameter by calculating a difference between the previous normed acceleration and the normed acceleration over the predefined period of time, for example, one second. In other words, the jert parameter can be calculated according to the following equation:

jert=(Previous normed acceleration−normed acceleration)/the predefined period of time.

In step S24, the processor 301 calculates a rotation parameter, a jerk parameter, and a jounce parameter based on at least one of the acceleration of the sensing signal received in step S21, the normed acceleration calculated in step S22 and the jert parameter calculated in step S23. Specifically, the rotation parameter is associated with rotational movement of the mobile device 300. The jerk parameter is associated with the rate of change of the acceleration; that is, the derivative of the acceleration with respect to time. The jounce parameter is associated with the rate of change of the jerk parameter; that is, the second derivative of the acceleration with respect to time.

In step S25, the processor 301 calculates an odds parameter based on at least one of the rotation parameter, the jerk parameter and the jounce parameter. Specifically, the odds parameter is associated with the likelihood that a knock is performed by the user on the housing 305.

In step S26, the processor 301 determines whether the odds parameter is greater than an odds threshold and the normed acceleration is greater than an acceleration threshold. In this embodiment, the odds threshold is 0.58, and the acceleration threshold is 0.003. When it is determined that the odds parameter is greater than the odds threshold and the normed acceleration is greater than the acceleration threshold, it means that it has been confirmed that a knock is performed on the mobile device 300, and the flow proceeds to step S27. Otherwise, the flow ends.

In step S27, the processor 301 generates an input code which is associated with the knock thus confirmed in step S26.

In step S28, the processor 301 determines whether the input code thus generated conforms to the preset touch code. In practice, several consecutive knocks may be confirmed in steps S21 to S26 based on the sensing signal, and the input code is associated with the several consecutive knocks. The preset touch code may be, for example, predetermined number of times of consecutive touch inputs on the mobile device 300. When it is determined that the input code conforms to the preset touch code, the flow proceeds to step S3. Otherwise, the flow ends.

In step S3, when it is determined in step S2 that the sensing signal conforms to the preset touch code, the processor 303 generates a control signal which is to be transmitted to the smart lock 200 for controlling the smart lock 200 to lock or unlock, i.e., to bring the lock device 100 to lock or unlock.

In step 34, the wireless module 304 of the mobile device 300 transmits the control signal to the smart lock 200. In addition, the mobile device 300 may generate a feedback indication to notify the user that the control signal is transmitted to the smart lock 200 for locking or unlocking the smart lock 200. The feedback indication is selected from the group consisting of a vibration indication, a sound notice, a visual indication and combinations thereof. The control signal is transmitted to the smart lock 200 over a secure channel, for example, with encryption and decryption mechanisms, so as to ensure secure transmission of the control signal.

It is noted that, in order to prevent unintentional control of the smart lock 200 due to unintentional touch inputs to the mobile device 300, in step S2 of the control method, the preset touch code can be set by the user in advance in a manner that the touch inputs are arranged in a specific frequency, such as one touch input per second. Alternatively, each time interval between any consecutive two of the touch inputs can be required to comply with a preset value, for example, the first and second touch inputs should have a time interval of substantially 0.5 seconds, and the second and third touch inputs should have a time interval of substantially one second; otherwise, the control signal will not be generated. In this way, higher security of the smart lock 200 may be achieved.

It should be noted herein that this disclosure is not limited to having the touch inputs be entered when the display 302 of the mobile device 300 is in the unmotivated state. In some implementations, the mobile device 300 may be configured such that certain touch inputs entered when the display 302 is activated are used to control the smart lock 200.

In the embodiment of the control method, both of the wireless unit 206 of the smart lock 200 and the wireless module 304 of the mobile device 300 are provided with Bluetooth functionalities, and may be paired in advance. Generally, the sensor 301 (gravity sensor) is unmotivated while the mobile device 300 is under ordinary operation. When the mobile device 300 is brought into proximity of the smart lock 200, the wireless module 304 detects the presence of the smart lock 200 by virtue of a Bluetooth network formed between the wireless module 304 and the wireless unit 206, and causes the processor 303 to activate the sensor 301 accordingly, so that the sensor 301 is able to sense the touch inputs performed by the user in step S1. In this way, the smart lock 200 can be locked or unlocked only when, the mobile device 300 is brought into proximity of the smart lock 200, and the door panel 103 may not be unintentionally opened while the user is away from the smart lock 200. It is noted that the wireless unit 206 and the wireless module 304 are not limited to be provided with Bluetooth functionalities, and may be provided with other short-range communication technologies, such as Near Field Communication (NFC).

Moreover, in a variation of the embodiment of the control method, the sensor 301 (gravity sensor) is provided in the smart lock 200, instead of the mobile device 300, and is coupled electrically to the control circuit 205. The touch inputs are several consecutive knocks by the finger knuckle of the user on the door panel 103. In this way, the sensor 301 provided in the smart lock 200, which is disposed on the door panel 103, is able to detect vibration of the smart lock 200 resulting from the knocks performed on the door panel 103. It is noted that the sensor 301 of the smart lock 200 is initially operated in a standby mode, in which the sensor 301 is unactivated when the smart lock 200 is locked, and is activated by the control circuit 205 only when the wireless unit 206 detects the presence of the mobile device 300 by virtue of the Bluetooth network formed between the wireless unit 206 and the wireless module 304. In this way, the sensor 301 of the smart lock 200 is activated only when the user having the mobile device 300 with him/her is near the smart lock 200, so as to achieve an effect of energy conservation.

Specifically, when the Bluetooth network, formed between the wireless unit 206 of the smart lock 200 and the wireless module 304 of the mobile device 300 lasts for more than a predefined first time period, for example, ten minutes, it means that the user may have entered a house with an entrance controlled by the door panel 103. Accordingly, the control circuit 205 is configured to deactivate the sensor 301. In this way, the smart lock 200 cannot be locked or unlocked by other individuals outside the house who performs the correct consecutive knocks on the door panel 103, and a higher security of the smart lock 200 may be ensured.

On the other hand, when the Bluetooth network formed between the wireless unit 206 of the smart lock 200 and the wireless module 304 of the mobile device 300 has ended for more than a predefined second time period, for example five minutes, it means that the user may have left the house. Accordingly, the control circuit 205 is configured to control the sensor 301 to operate in the standby mode once again.

In addition, the wireless unit 206 of the smart lock 200 is configured to detect signal properties, such as orientations and magnitudes of waveforms, associated with the Bluetooth network, which is formed between the wireless unit 206 of the smart lock 200 and the wireless module 304 of the mobile device 300, so as to determine whether the user carrying the mobile device 300 is in the house or outside the house. In this way, the aforementioned comparison operations related to whether the Bluetooth network lasts for more than the first time period or has ended for more than the second time period may be omitted. Alternatively, the detection of signal properties may be utilized in cooperation with the comparison operations so as to achieve higher accuracy of determination as to whether the user is in the house or has left the house.

Figure 1:
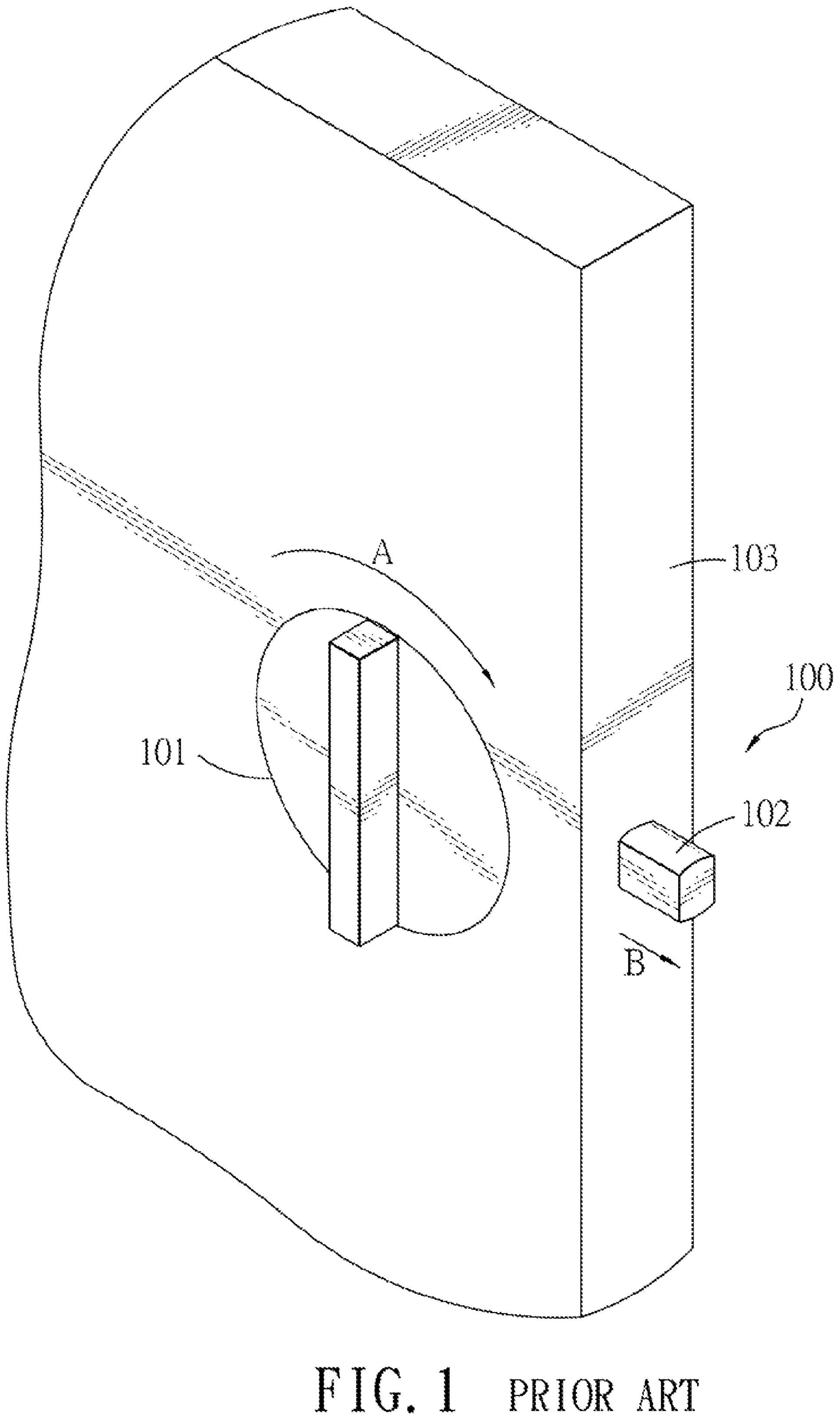
FIG. 1 PRIOR ART
FIG. 1 is a perspective view of a conventional lock device.
Figure 6:
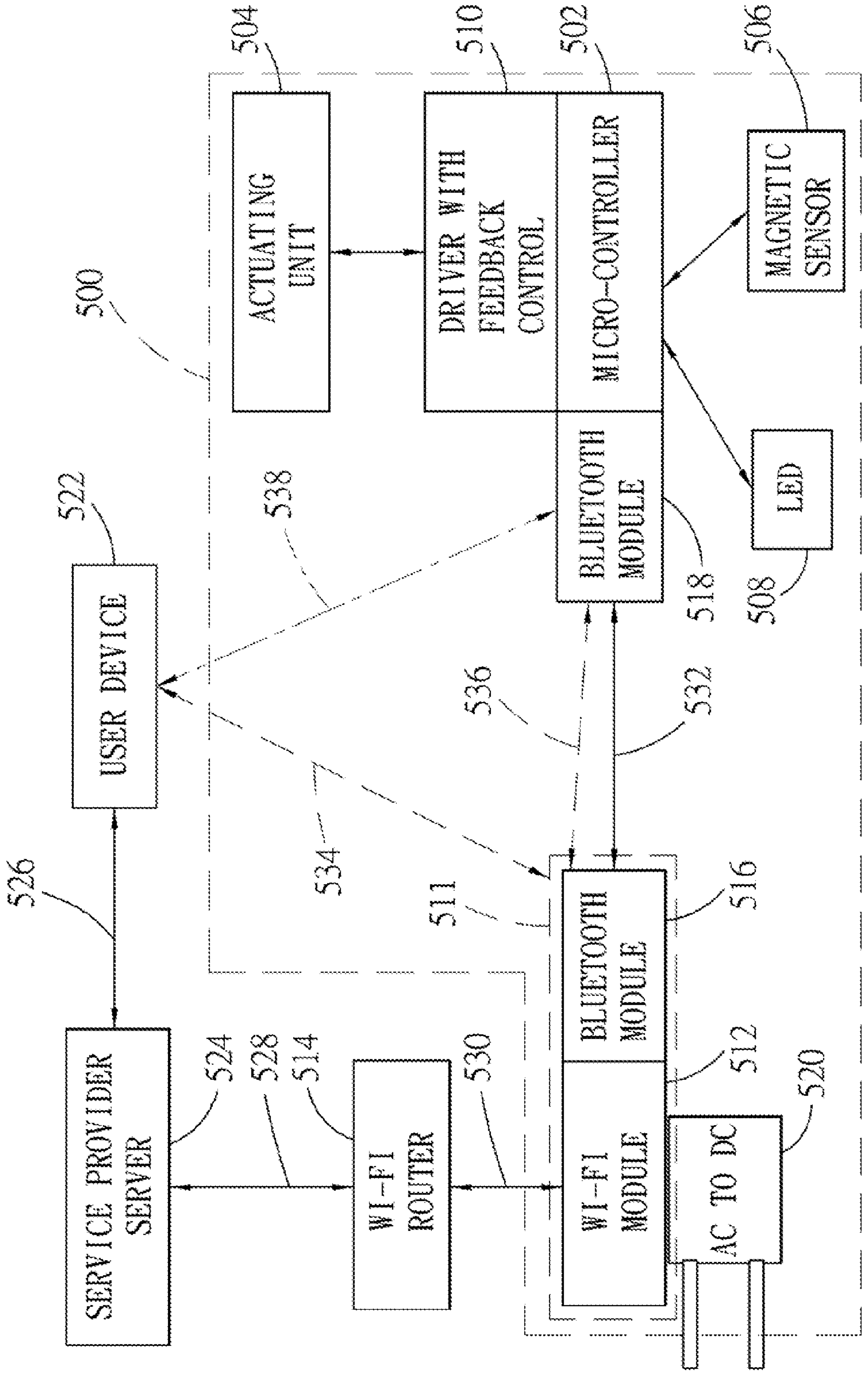
FIG. 6 is a block schematic diagram of a lock system in accordance with an embodiment of the disclosure.

FIG. 6 illustrates a block schematic diagram of a lock system including a smart lock device 500 in accordance with an embodiment of the disclosure. The smart lock device 500 may be interfaced with the conventional lock device 100 (see FIG. 1). The smart lock device 500 includes a microcontroller 502 and an actuating unit 504. The actuating unit 504 may be a servo motor, a DC motor, a stepper motor, a solenoid actuator, etc. The smart lock device 500 may also include a magnetic sensor 506 that detects the positioning of the door panel 103 (see FIG. 1) based on a magnetic strip (not shown) positioned on the door frame. When the magnetic sensor 506 detects presence of the magnetic strip, it indicates that the door panel 103 is closed and when the magnetic sensor 506 detects absence of the magnetic strip, it indicates that the door panel 103 is open. The smart lock device 500 also includes an LED 508 connected to the microcontroller 502. The LED 508 may indicate the status of the lock device 100. The smart lock device 500 may be powered using a battery (not shown).

The microcontroller 502 is operably connected to the actuating unit 504 via a driver with feedback control 510 for checking configuration of the lock device 100 (e.g., a mechanical lock). The microcontroller 502 can activate the actuating unit 504 by sending a trigger signal to the driver with feedback control 510 having a potentiometer or a decoder. For example, the microcontroller 502 may send pulse-width modulation (PWM) signals to the driver with feedback control 510, which then actuates the actuating unit 504. The actuating unit 504 is attached to the thumb turn 101 (see FIG. 1), such that when activated the actuating unit 504 turns the thumb turn 101 by a required angle. The actuating unit 504 is calibratable to adapt to various positions of original lock states of different lock devices.

In addition, the smart lock device 500 further includes a Wi-Fi module 512, which is connected to a Wi-Fi router 514. The Wi-Fi module 512 is in communication with the microcontroller 502 through a Bluetooth module 516 and another Bluetooth module 518. The Bluetooth module 516 and the Bluetooth module 518 may be Bluetooth 4.0 compliant. The Wi-Fi module 512 and/or the Bluetooth module 516 act as a communication gateway 511, which may be used to control multiple lock devices within a certain range. The Wi-Fi module 512 may be an Arduino Yún board that has a Wi-Fi module built on board. An AC to DC power supply 520 powers the Wi-Fi module 512 and the Bluetooth module 516.

A user may use a user device 522 to connect to a service provider server 524, which is in communication with the Wi-Fi module 512 via the Wi-Fi router 514. The user device 522 may be a smartphone, a smart TV, Google Glass, or any other similar electronic communication device. Further, the user device 522 includes a software application that sends and receives signals from the smart lock device 500 through the Wi-Fi module 512. This will be explained in further detail in conjunction with FIGS. 7, 8, 9 and 10. Further, the software application executed by the user device 522 may use bioinformatic approaches, such as voice recognition, touch ID, facial recognition, etc., to provide a rich interaction experience to the user during his/her interaction with the smart lock device 500. The service provider server 524 maintains a user database of the user using the smart lock device 500. Further, the service provider server 524 provides a secure channel for the user to communicate with the smart lock device 500. Still further, the service provider server 524 may be provided and maintained by the manufacturer/provider of the smart lock device 500 or the lock device 100. The smart lock device 500 updates its status, e.g. lock, unlock, door open or more, in real time via the service provider server 524 which communicates with the user device 522. In a local area network scenario, status update is transmitted via the Bluetooth modules 516 and 518.

In a normal operation, the user device 522 communicates with the microcontroller 502 via a communication path indicated by 526, 528, 530, 532. However, if the Wi-Fi network is not working, then the user device 522 communicates with the microcontroller 502 via a communication path indicated by 534, 536 over Bluetooth connections. Further, if the AC to DC power supply 520 is not working, then both the Wi-Fi module 512 and the Bluetooth module 516 are not functional. In such a scenario, the user device 522 directly communicates with the microcontroller 502 via a communication path 538 over a Bluetooth connection.

Figure 7:
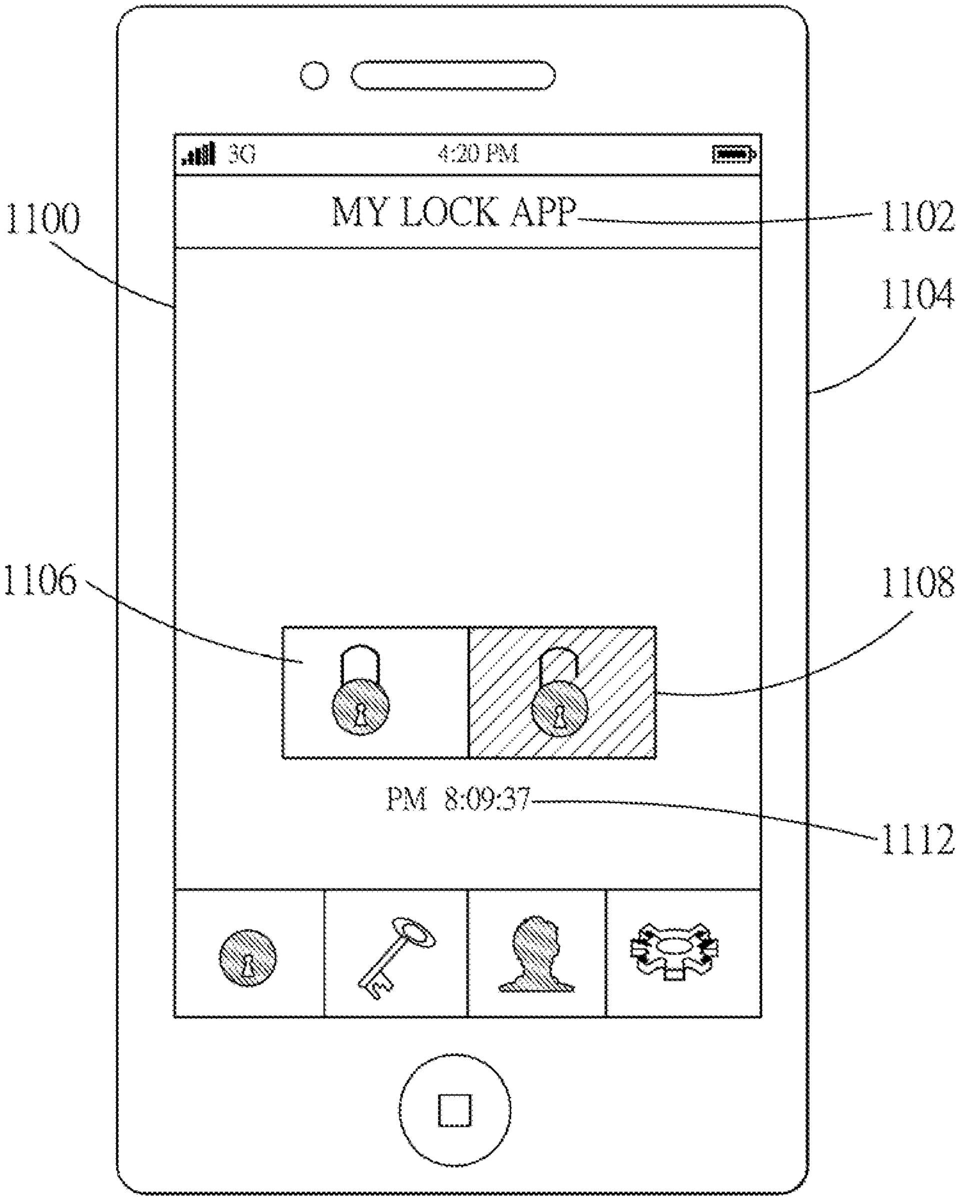
FIG. 7 illustrates a first user interface of a smartphone application in accordance with an embodiment of the disclosure.

FIG. 7 illustrates a first user interface 1100 of a "My Lock App" smartphone application 1102 in accordance with an embodiment of the disclosure. A user may interact with the smart lock device 500 using the "My Lock App" smartphone application 1102 installed on a smartphone 1104 (i.e., the user device 522). The first user interface 1100 shows a lock button 1106 and an unlock button 1108. Further, the unlock button 1106 is highlighted which indicates the unlock state to be a current state of the corresponding smart lock device 500. The first user interface 1100 shows a real time update.

Further, the user may use the lock button 1106 to lock the smart lock device 500. The smart lock device 500 may be locked or unlocked using electronic keys. An electronic key is an encrypted code that is unique to a specific smart lock device 500. Further, users can share their electronic keys with other users by sending the electronic keys using the "My Lock App" smartphone application 1102. Users can share their electronic keys with other users such as family members, friends, babysitters, cleaning personnel and roommates. Further, users may share electronic keys, which are enabled to operate only within a certain period every day. For example, the user may share an electronic key with the cleaning personnel such that they may use the electronic key from 4:00 PM to 4:30 PM only. Yet further, the users may deactivate electronic keys shared earlier with other users. To register a specific smart lock device 500 with the "My Lock App" smartphone application 1102, the user must have access to the corresponding electronic key.

The "My Lock App" smartphone application 1102 also helps users initial setup of the smart lock device 500, share electronic keys, receive electronic keys, track electronic keys, view history of lock activity. The smart lock device 500 is able to alarm users immediately if the smart lock device 500 is physically being hacked. Configuration of other available features is also possible.

Figure 8:
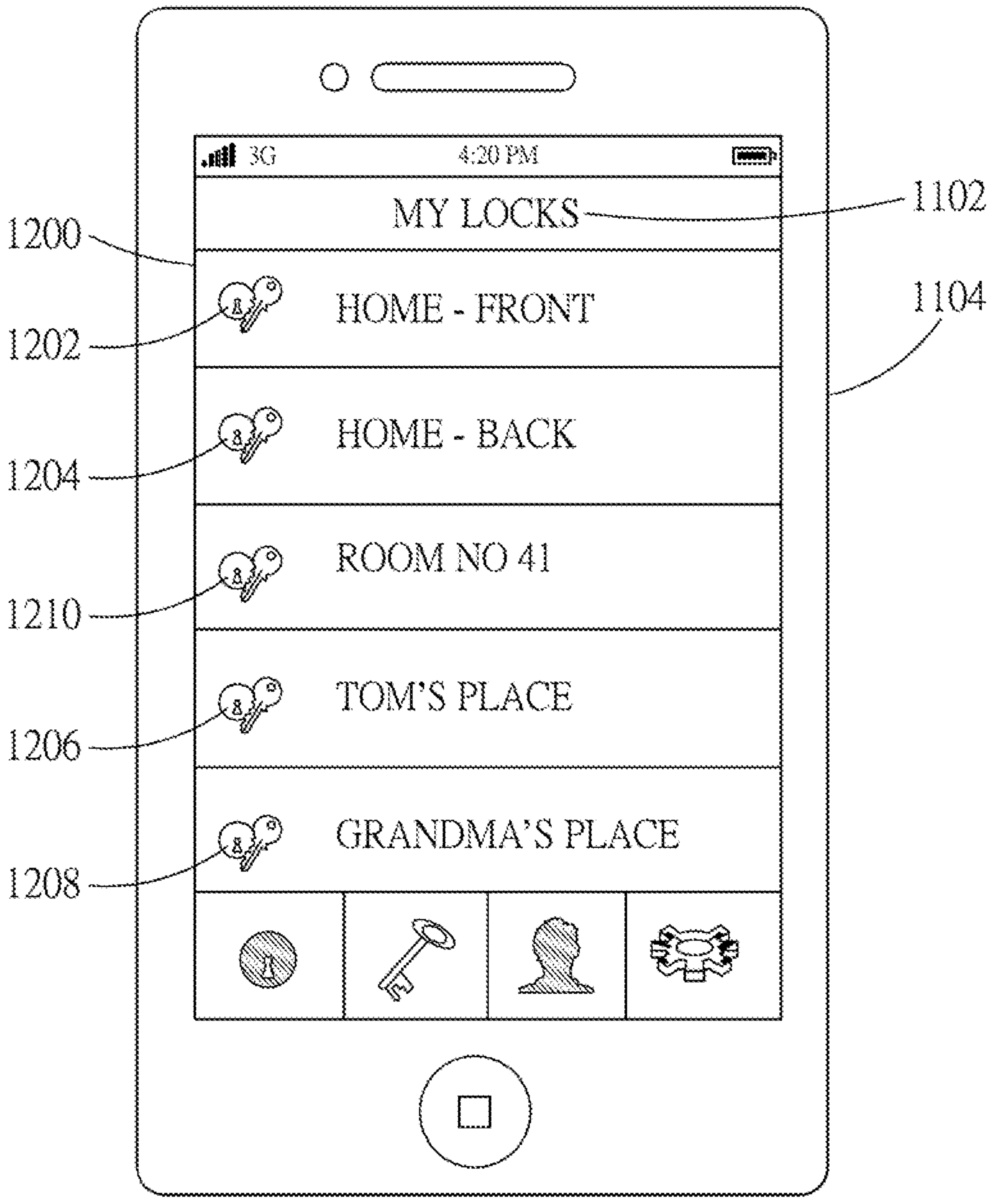
FIG. 8 illustrates a second user interface of the smartphone application in accordance with an embodiment of the disclosure.

FIG. 8 illustrates a second user interface 1200 of the "My Lock App" smartphone application 1102 in accordance with an embodiment of the disclosure. The "My Lock App" smartphone application 1102 may be used to interact with multiple smart locks. The second user interface 1200 lists multiple smart locks that the user has registered with the "My Lock App" smartphone application 1102. The user may register one or more smart locks installed on their own homes, for example, a smart lock, indicated as "Home-Front" 1202 and a smart lock "Home-Back" 1204. Further, the user may register smart locks for which they have received electronic keys from corresponding owners of the smart locks including friends (for example, a smart lock indicated as "Tom's place" 1206) and family members (for example, a smart lock indicated as "Grandma's place" 1208). Yet further, the user may register smart locks of their hotel rooms (for example, a smart lock indicated as "Room No. 41" 1210). The electronic key for the smart locks of hotel rooms may be shared by the hotel management.

Figure 9:
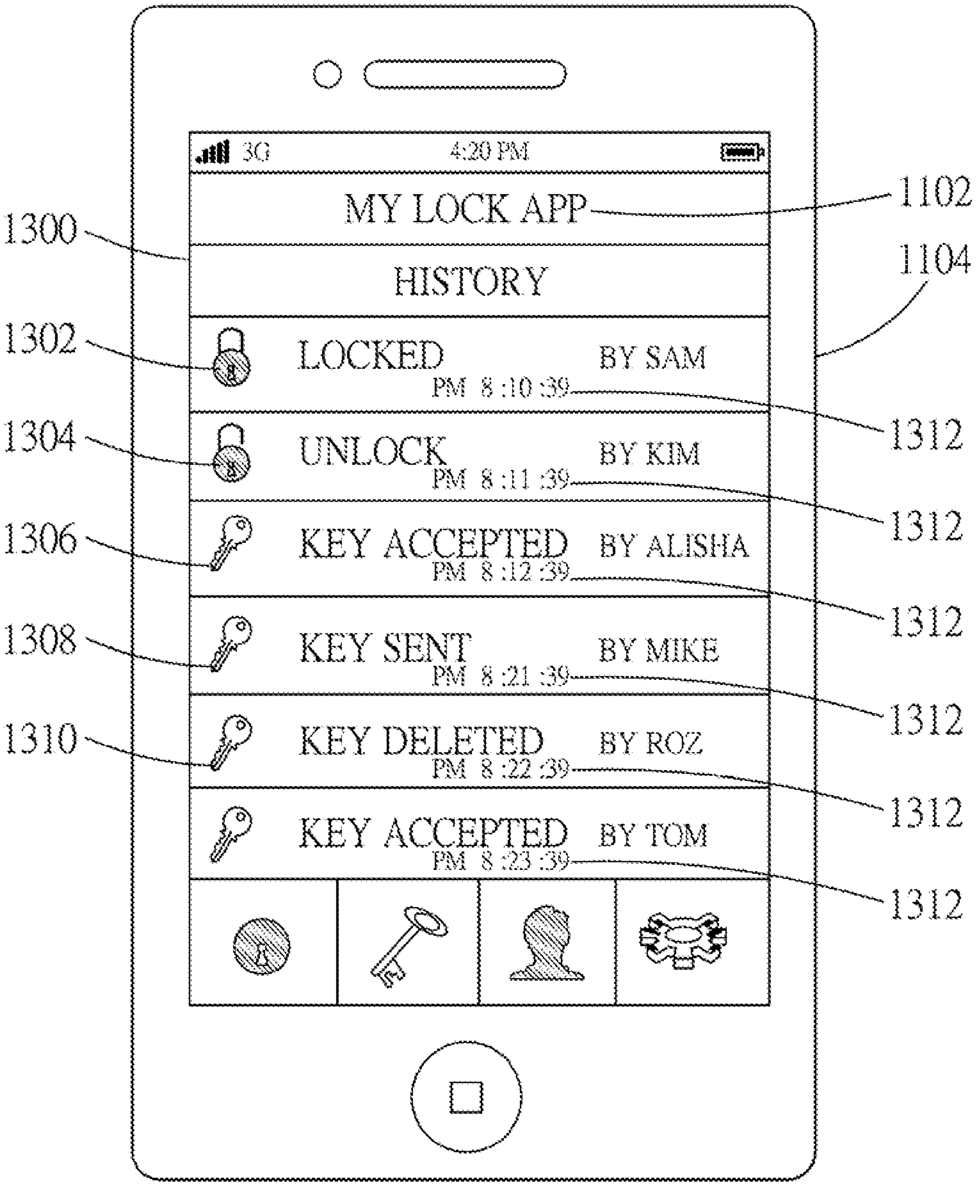
FIG. 9 illustrates a third user interface of the smartphone application in accordance with an embodiment of the disclosure.

FIG. 9 illustrates a third user interface 1300 of the "My Lock App" smartphone application 1102 in accordance with an embodiment of the disclosure. The My Lock App" smartphone application 1102 allows users to track their locks and electronic keys. The third user interface 1300 shows history of activity for a particular user. In the depicted example, a list of various activities including "locked by Sam" activity 1302, "unlocked by Kim" activity 1304, "key accepted by Alisha" activity 1306, "key sent by Mike" activity 1308 and "key deleted by Roz" activity 1310 is displayed. The detailed time of operation is shown in 1312.

Figure 10:
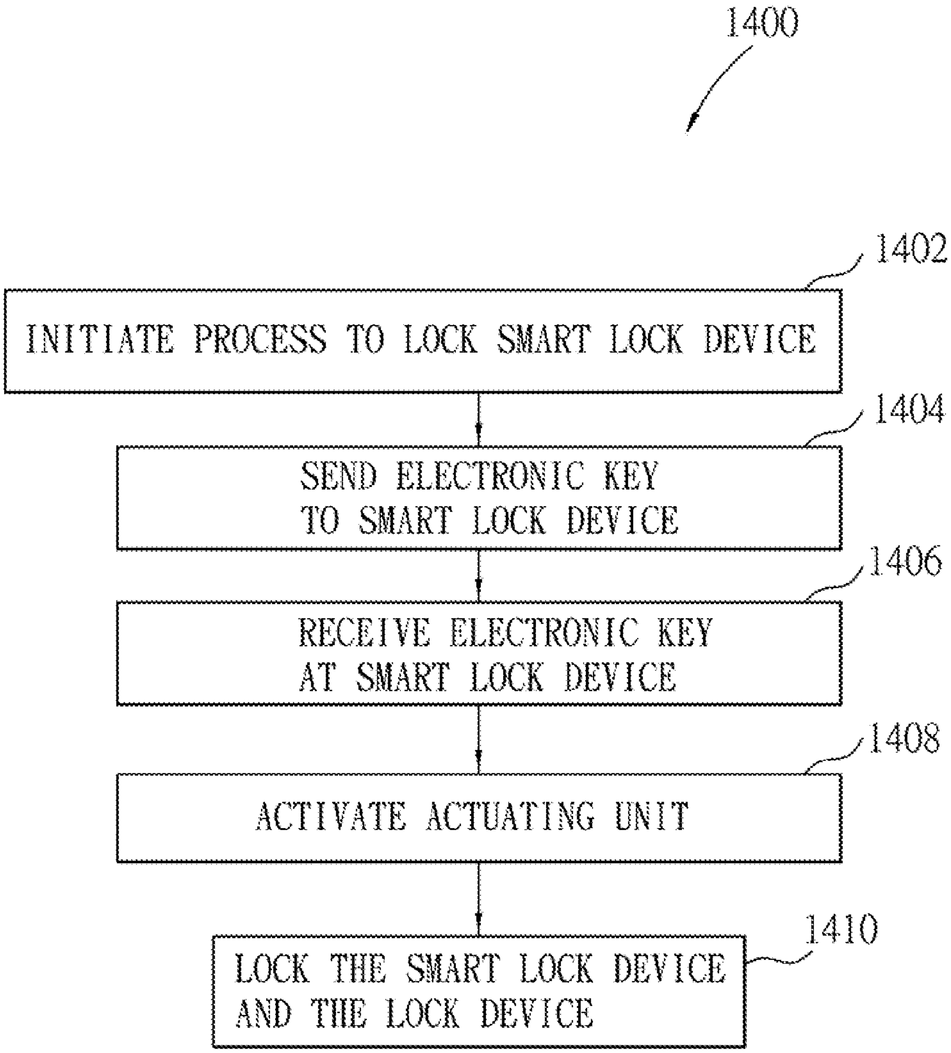
FIG. 10 is a flow chart illustrating a method for facilitating interactions between the mobile device and the smart lock in accordance with the disclosure.

FIG. 10 illustrates a method 1400 for facilitating interaction with a particular smart lock device 500, in accordance with the disclosure. Referring to FIG. 10 in combination with FIGS. 3, 7, 8 and 9, in step 1402, a user uses the "My Lock App" smartphone phone application 1102, browses to the first user interface 1100 and uses the lock button 1106 to initiate a process to lock the particular smart lock device 500. Next, in step 1404, the user device 522 sends the corresponding electronic key to the particular smart lock device 500 over the Internet via the service provider server 524 and the Wi-Fi router 514. Thereafter, in step 1406, the Wi-Fi module 512 of the smart lock device 500 receives the electronic key, and then forwards the electronic key to the microcontroller 502, which checks if the received electronic key is an acceptable key. If the received electronic key is found to be wrong, then the microcontroller 502 may send an error message back to the user device 522. Further, if the microcontroller 502 determines that the door is not closed based on the magnetic sensor 506 that detects the positioning of the door according to the magnetic strip (not shown) positioned on the door frame, then again the microcontroller 502 may send a "door not closed" message back to the user device 522, or send a "closed but not locked" message if the door is closed but the smart lock device 500 is unlocked. However, if the received electronic key is found to be acceptable, then the microcontroller 502 activates the actuating unit 504 in step 1408. Finally, the actuating unit 504 locks the smart lock device 500, and in turn locks the lock device 100 (see FIG. 1) in step 1410. Further, an LED indication (not shown) of the smart lock device 500 may be turned on once the smart lock device 500 is locked.

In summary, by use of the smart lock 200 of this disclosure, locking and unlocking of the lock device 100, specifically, switching of the thumb turn 101 between the lock and unlock states, may be controlled by physically operating the substitute thumb turn 202 of the smart lock 200, or by remotely entering touch inputs in a predefined manner on the mobile device 300, even when the display 302 of the mobile device 300 is unactivated.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A control method of a smart lock, the control method to be implemented by a mobile device which is communicably coupled to the smart lock and comprising the steps of:

sensing touch inputs performed upon the mobile device by detecting vibrations of the mobile device resulting from the touch inputs, so as to generate a sensing signal;

determining whether the sensing signal conforms to a preset touch code, the preset touch code is associated with a predetermined sequence of touch inputs on the mobile device and is set in advance in a manner that the touch inputs are arranged in a specific frequency;

generating a control signal which is to be transmitted to the smart lock for controlling the smart lock to lock or unlock when it is determined that the sensing signal conforms to the preset touch code; and transmitting the control signal to the smart lock.

2. The control method according to claim 1, the touch inputs including at least one knock performed on the mobile device, wherein the step of determining whether the sensing signal conforms to a preset touch code includes:

calculating a normed acceleration according to the sensing signal which includes at least one entry of acceleration;

calculating a jert parameter by calculating a difference between a previous normed acceleration and the normed acceleration over a predefined period of time, the previous normed acceleration being calculated before the predefined period of time;

calculating a rotation parameter, a jerk parameter, and a jounce parameter based on at least one of the acceleration of the sensing signal, the normed acceleration thus calculated, and the jert parameter thus calculated;

calculating an odds parameter based on at least one of the rotation parameter, the jerk parameter and the jounce parameter, the odds parameter being associated with the likelihood that the knock is performed on the housing;

making a first determination as to whether the odds parameter is greater than an odds threshold and the normed acceleration is greater than an acceleration threshold;

generating an input code which is associated with the knock performed on the mobile device when a result of the first determination is affirmative; and making a second determination as to whether the input code conforms to the preset touch code, the flow proceeding to the step of generating a control signal when a result of the second determination is affirmative.

3. The control method according to claim 1, wherein in the step of determining whether the sensing signal conforms to a preset touch code, each time interval between any consecutive two of the touch inputs is required to comply with a preset value.

4. The control method according to claim 1, the smart lock and the mobile device being provided with Bluetooth functionalities, and being paired in advance, the mobile device including a sensor which is initially operated in a standby mode, in which the sensor is unactivated, the control method further comprising the steps of:

detecting the presence of the smart lock by virtue of a Bluetooth network formed between the smart lock and the wireless unit when the mobile device is brought into proximity of the smart lock; and activating the sensor for allowing sensing of the touch inputs performed upon the mobile device.

5. The control method according to claim 4, further comprising the step of:

deactivating the sensor when detecting that the Bluetooth network formed between the smart lock and the mobile device lasts for more than a predefined first time period.

6. The control method according to claim 4, further comprising the step of:

controlling the sensor to operate in the standby mode once again when detecting that the Bluetooth network formed between the smart lock and the mobile device has ended for more than a predefined second time period.

7. The control method according to claim 1, the mobile device storing an electronic key which is an encrypted code that is unique to the smart lock, the control method further comprising the step of:

sending the electronic key to the smart lock over a wireless network, receipt of the electronic key enabling the smart lock to check if the electronic key thus received is an acceptable key for controlling the smart lock to lock or unlock when the electronic key is found to be acceptable.

8. A smart lock to be removably mounted to a lock device and to be remotely controlled by a mobile device to cause the lock device to switch between a lock state and an unlock state, the lock device including a thumb turn, the smart lock comprising:

a housing which is formed with an opening;

an intermediate coupling which is to be coupled to the thumb turn of the lock device via the opening of said housing;

an actuate unit which is coupled to said intermediate coupling, and which is configured to actuate operation of the intermediate coupling so as to cause rotation of the thumb turn;

a wireless unit which is configured to receive a control signal from the mobile device; and a control circuit which is coupled to said wireless unit, and which receives the control signal from the mobile device via said wireless unit, said control circuit being configured to generate an actuate signal in response to receipt of the control signal, and being further coupled electrically to said actuate unit for transmitting the actuate signal generated thereby to said actuate unit to activate the actuate unit.

9. A control method of a smart lock, the control method to be implemented by the smart lock and comprising the steps of:

sensing touch inputs performed upon the smart lock by detecting vibrations of the smart lock resulting from the touch inputs, so as to generate a sensing signal;

determining whether the sensing signal conforms to a preset touch code, the preset touch code is associated with a predetermined sequence of touch inputs on the smart lock and is set in advance in a manner that the touch inputs are arranged in a specific frequency; and generating a control signal for controlling the smart lock to lock or unlock when it is determined that the sensing signal conforms to the preset touch code.

10. The control method according to claim 9, the touch inputs including at least one knock performed on the smart lock, wherein the step of determining whether the sensing signal conforms to a preset touch code includes:

calculating a normed acceleration according to the sensing signal which includes at least one entry of acceleration;

calculating a jert parameter by calculating a difference between a previous normed acceleration and the normed acceleration over a predefined period of time, the previous normed acceleration being calculated before the predefined period of time;

calculating a rotation parameter, a jerk parameter, and a jounce parameter based on at least one of the acceleration of the sensing signal, the normed acceleration thus calculated, and the jert parameter thus calculated;

calculating an odds parameter based on at least one of the rotation parameter, the jerk parameter and the jounce parameter, the odds parameter being associated with the likelihood that the knock is performed on the housing;

making a first determination as to whether the odds parameter is greater than an odds threshold and the normed acceleration is greater than an acceleration threshold;

generating an input code which is associated with the knock performed on the smart lock when a result of the first determination is affirmative; and making a second determination as to whether the input code conforms to the preset touch code, the flow proceeding to the step of generating a control signal when a result of the second determination is affirmative.

11. The control method according to claim 9, wherein in the step of determining whether the sensing signal conforms to a preset touch code, each time interval between any consecutive two of the touch inputs is required to comply with a preset value.

12. A lock system comprising:

a user device which is operable to send an electronic key;

a service provider server which is communicably coupled to said user device for receiving the electronic key; and a smart lock device to be interfaced with a lock device, and including an actuating unit which is to be attached to a thumb turn of the lock device, and which when activated turns the thumb turn by a required angle, a communication gateway which is in communication with said service provider server via a Wi-Fi router, which receives the electronic key from said service provider server, and which directly forwards the electronic key, a Bluetooth module which receives the electronic key from said communication gateway, and a microcontroller which receives the electronic key from said communication gateway via said Bluetooth module, which checks whether the electronic key thus received is an acceptable key, and which activates said actuating unit when the electronic key is found to be acceptable, so as to cause the lock device to switch between a lock state and an unlock state.

13. The lock system according to claim 12, wherein said communication gateway includes:

a Wi-Fi module which is to be in communication with the Wi-Fi router and which receives the electronic key from said service provider server via the Wi-Fi router; and another Bluetooth module which transmits the electronic key received at said Wi-Fi module to said Bluetooth module.

14. The lock system according to claim 13, further comprising a driver with feedback control, said microcontroller being connected to said actuating unit via said driver with feedback control for checking configuration of the lock device, and being configured to activate said actuating unit by sending a trigger signal to said driver with feedback control which then actuates the actuating unit.

* * * * *